United States Patent
Song et al.

(10) Patent No.: US 9,746,882 B2
(45) Date of Patent: Aug. 29, 2017

(54) ELECTRONIC DEVICE WITH CURVED DISPLAY MODULE

(71) Applicant: Samsung Electronics Co., Ltd., Gyeonggi-do (KR)

(72) Inventors: Chan-Keun Song, Seoul (KR); Jong-Chul Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 88 days.

(21) Appl. No.: 14/495,172

(22) Filed: Sep. 24, 2014

(65) Prior Publication Data

US 2015/0098174 A1    Apr. 9, 2015

(30) Foreign Application Priority Data

Oct. 9, 2013  (KR) .......................... 10-2013-0120218

(51) Int. Cl.
*G06F 1/16* (2006.01)

(52) U.S. Cl.
CPC .......... *G06F 1/1635* (2013.01); *G06F 1/1626* (2013.01); *G06F 1/1658* (2013.01)

(58) Field of Classification Search
CPC ..... G06F 1/1635; G06F 1/1658; G06F 1/1626
USPC .......................... 361/679.27, 679.55, 679.56
See application file for complete search history.

(56) References Cited

U.S. PATENT DOCUMENTS

| | | | |
|---|---|---|---|
| 8,247,107 B2 * | 8/2012 | Park | H01M 2/1044 361/752 |
| 2002/0183094 A1 * | 12/2002 | Seita | H01Q 1/2283 455/558 |
| 2003/0063041 A1 * | 4/2003 | Kurashima | G02F 1/13452 345/1.1 |
| 2010/0104275 A1 * | 4/2010 | Takeya | G02B 7/102 396/543 |
| 2010/0277448 A1 * | 11/2010 | Okamoto | G02F 1/133305 345/206 |
| 2012/0026666 A1 | 2/2012 | Crooijmans et al. | |
| 2012/0216437 A1 | 8/2012 | Ahlberg | |
| 2012/0243151 A1 * | 9/2012 | Lynch | H04M 1/0202 361/679.01 |
| 2012/0262870 A1 * | 10/2012 | Leung | G06F 1/1626 361/679.27 |
| 2012/0314354 A1 * | 12/2012 | Rayner | H01H 13/06 361/679.01 |

(Continued)

FOREIGN PATENT DOCUMENTS

| | | |
|---|---|---|
| EP | 1 191 411 A2 | 3/2002 |
| JP | 2009-20168 A | 1/2009 |

(Continued)

OTHER PUBLICATIONS

European Search Report dated Jun. 16, 2017.

*Primary Examiner* — Tuan T Dinh
*Assistant Examiner* — Rockshana Chowdhury
(74) *Attorney, Agent, or Firm* — Cha & Reiter, LLC.

(57) ABSTRACT

Disclosed herein is an electronic device with a curved display module. A housing has a first surface adjacent to the display module and the first surface is formed to have a curvature corresponding to the curvature of the display module. At least one electronic component is disposed in a second surface of the housing that is opposite to the first surface.

21 Claims, 12 Drawing Sheets

(56) References Cited

U.S. PATENT DOCUMENTS

| | | | |
|---|---|---|---|
| 2013/0076612 A1* | 3/2013 | Myers | G06F 1/1626 345/156 |
| 2013/0083496 A1* | 4/2013 | Franklin | G06F 1/1626 361/749 |
| 2013/0100392 A1* | 4/2013 | Fukushima | G09F 9/30 349/150 |
| 2013/0140965 A1* | 6/2013 | Franklin | G06F 1/1626 312/223.1 |
| 2013/0241798 A1* | 9/2013 | Lee | H01Q 1/50 343/876 |

FOREIGN PATENT DOCUMENTS

| | | |
|---|---|---|
| JP | 2012-199697 A | 10/2012 |
| WO | 2011/114190 A1 | 9/2011 |

* cited by examiner

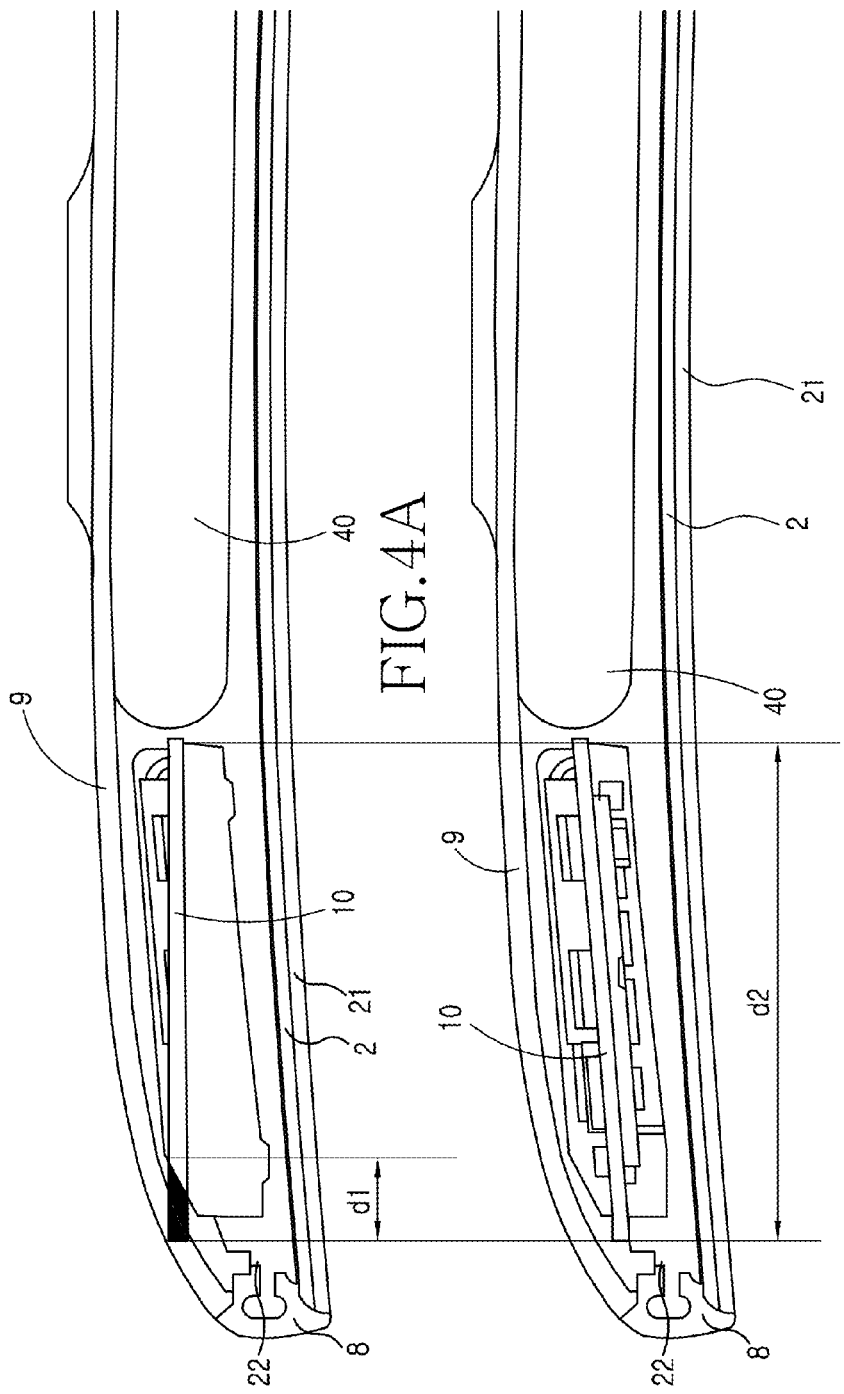

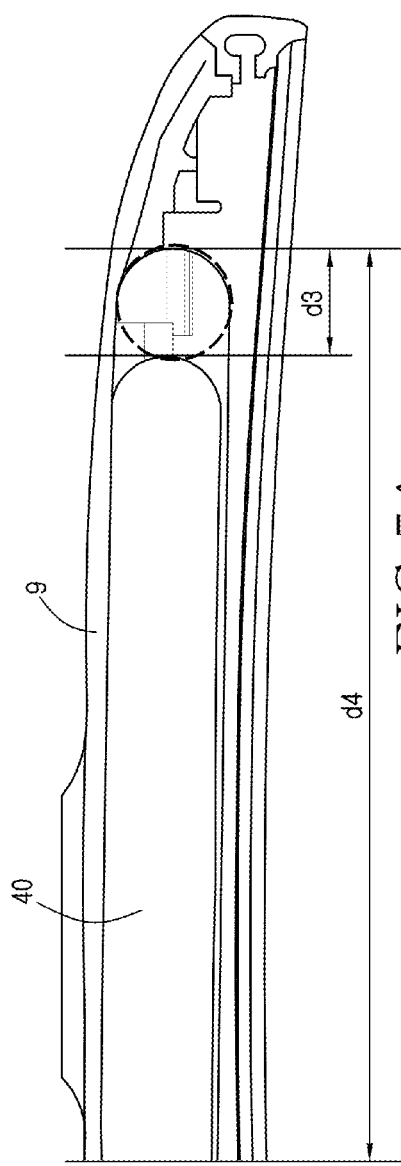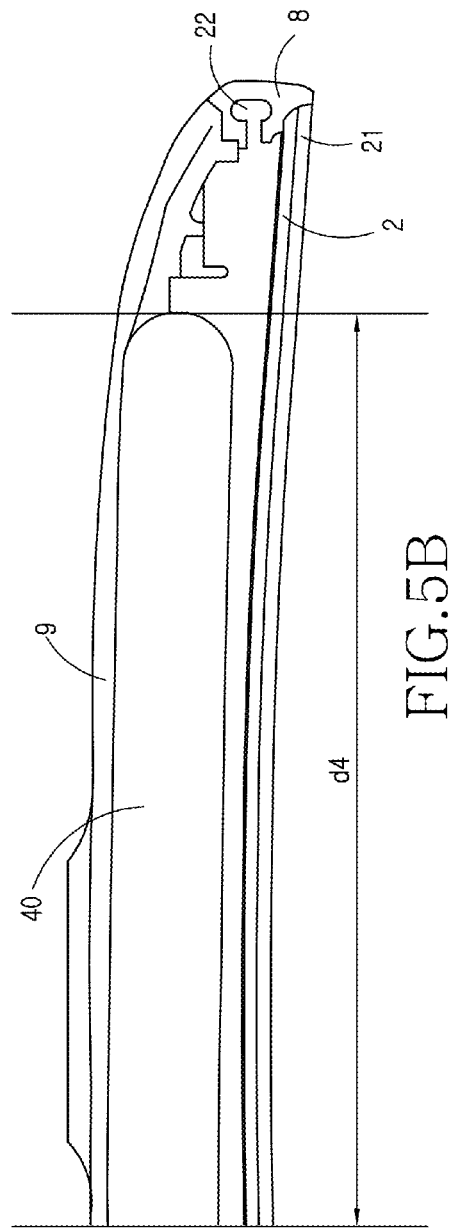

ELECTRONIC DEVICE WITH CURVED DISPLAY MODULE

CLAIM OF PRIORITY

This application claims priority under 35 U.S.C. §119 to a Korean Patent application filed in the Korean Intellectual Property Office on Oct. 9, 2013 and assigned Serial No. 10-2013-0120218, the entire disclosure of which is incorporated herein by reference.

BACKGROUND

1. Field

The present disclosure relates generally to an electronic device with a curved display module.

2. Description of the Related Art

With the development of multimedia technology, electronic devices with various functions are readily available. These electronic devices generally have a convergence function that performs a combination of one or more functions. They may further include a large screen touch-type display module and a high pixel camera module to capture still pictures and moving pictures. These extra features may be provided in addition to basic calling functions. Furthermore, today's electronic devices may play back multimedia content, such as music and moving pictures, and may connect to a network for web surfing. These electronic devices may also be equipped with a high-performance processor to perform various convergence functions. Thus, sub-mobile terminals have been developed such that its main calling function now seems supplementary.

As electronic devices become more multifunctional, devices with better portability are becoming more competitive. When consumers decide between electronic devices with similar functions, a consumer may prefer an electronic device with a slim profile, beautiful appearance, excellent portability, and excellent grip feel. Therefore, manufacturers of electronic devices have tried to develop devices that meet such criteria while attempting to perform the standard functions at least as good as the competition.

SUMMARY

The present disclosure has been made in view of the above. Accordingly, disclosed herein is an electronic device with a curved display module that provides excellent portability, grip feel, and a beautiful appearance to make the device more aesthetically pleasing. The electronic device disclosed herein may have electronic components that are efficiently mounted, thereby contributing to a slim profile of the electronic device.

In one aspect, an electronic device may include: a display module with a curvature; a housing having a first surface adjacent to the display module, the first surface having a curvature corresponding to the curvature of the display module; and at least one electronic component disposed in a second surface of the housing, the second surface being opposite to the first surface, the at least one electronic component being disposed to have a slope with respect to a horizontal plane.

In another aspect, an electronic device may include: a display module with a curvature; a housing having a first surface adjacent to the display module, the first surface having a curvature corresponding to the curvature of the display module; at least one substrate disposed on a second surface of the housing, the second surface being opposite to the first surface; and a battery pack disposed alongside the at least one substrate, the at least one substrate and the battery pack being disposed to have a slope with respect to a horizontal plane.

BRIEF DESCRIPTION OF THE DRAWINGS

The above features and advantages of the present disclosure will become more apparent from the following detailed description when taken in conjunction with the accompanying drawings in which:

FIG. 4A and FIG. 4B are cross-sectional views of an example electronic device illustrating an arrangement of a substrate in accordance with aspects of the present disclosure;

FIG. 5A and FIG. 5B are cross-sectional views of an example electronic device illustrating an arrangement of a substrate in accordance with aspects of the present disclosure;

DETAILED DESCRIPTION

Figure 1:
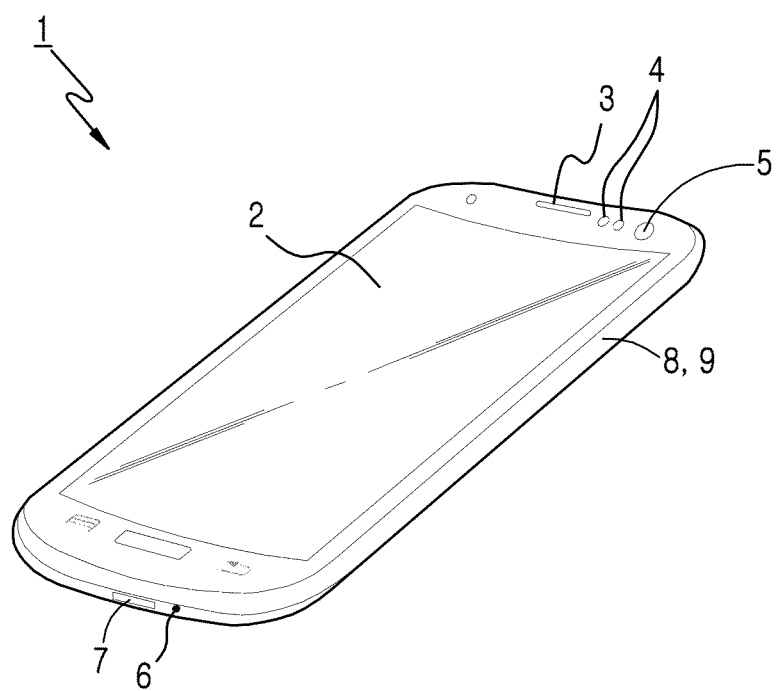
FIG. 1 is a perspective view illustrating an example electronic device including a curved shape in accordance with aspects of the present disclosure.

The following description with reference to the accompanying drawings is provided to assist in a comprehensive understanding of the disclosure as defined by the appended claims and their equivalents. The present disclosure includes various specific details to assist in that understanding but these are to be regarded as merely illustrative. Accordingly, those of ordinary skill in the art will recognize that various changes and modifications of the examples described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of the present disclosure is provided for illustrative purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In various examples of the present disclosure, a display module may be referred to as a "display", and may be a liquid crystal display (LCD) module for outputting input data. However, various examples of the present disclosure are not limited to the above-described configurations. The display module disclosed of the present disclosure may be a touchscreen device in which an input operation using an input device and a display operation using a display are performed on one physical screen. In one example, the display module is disposed at a front side of an electronic device, and may include a window mounted thereon and having a curvature corresponding to the display module.

In another example, the display module may be formed to have a curvature. In a further example, the display module may be a flexible display module. In yet another example, the display module may be formed of a flexible plastic material, such as a film. For example, the display module may be a flexible OLED.

In another example, the display module may have a curved front surface with a predetermined curvature and a flat rear surface. Examples of the present disclosure are not limited to the forgoing configuration such that a case frame having a curved front surface and a curved rear surface may also be employed. In one example, the curvature of the display module disposed at a front side may be substantially identical to a curvature of the case frame disposed at a rear side. In another example, the curvature of the display module disposed at the front side may be substantially identical to a curvature of the case frame disposed at the rear side.

The electronic device may include various devices including a curved display module, such as a personal digital assistant (PDA), a laptop computer, a mobile phone, a smart phone, a netbook, a mobile internet device (MID), an ultra mobile personal computer (UMPC), a tablet PC, a navigation device, and an MP3 player.

In one example, an electronic device may include a display module with a curvature; a housing having a first surface adjacent to the display module, the first surface having a curvature corresponding to the curvature of the display module; and at least one electronic component disposed in a second surface of the housing, the second surface being opposite to the first surface, the at least one electronic component being disposed to have a slope with respect to a horizontal plane.

The at least one electronic component may comprise a slope corresponding to a straight line passing a tangent line of the display module, the tangent line corresponding to a central line of the electronic component.

The second surface of the housing may be formed to have a slope substantially identical to a slope with which the at least one electronic component is disposed or is formed to be substantially flat to support the at least one electronic component. The second surface of the housing may include at least one mounting portion for mounting the at least one electronic component, which is formed thereon along the slope with which the at least one electronic component is disposed.

The at least one electronic component may be at least one of at least one substrate, a battery pack, an interface connector, a camera module, a microphone module, an ear jack module, an antenna module, a speaker module, a vibrator device, a shield can for shielding, a socket for accommodating a card-type external device, and various sensor modules.

A border portion between the battery pack and the substrate may be set as a starting point from which the battery pack and a main substrate start to incline, when the main substrate and the battery pack of the at least one electronic components are disposed alongside each other.

The at least one substrate may be electrically connected such that at least two substrates are mutually movable by a flexible printed circuit (FPC). The at least one substrate may include a main substrate, and at least one sub-substrate connected to the main substrate, the sub-substrate comprising at least one connection substrate electrically connected thereto by the flexible printed circuit (FPC).

At least one of the sub-substrate and the connection substrate may be disposed at a height different than that of the main substrate. An antenna radiator having a predetermined height may be mounted in the substrate at a height different than that of the main substrate. The antenna radiator having a predetermined height may be disposed in an antenna carrier mounted in at least one of the sub-substrate and the connection substrate. The antenna radiator may be mounted in a substrate which is further spaced apart from a case frame of the electronic device.

The connection substrate may be disposed at a height different than that of the sub-substrate and be mounted with a tact switch that operates in interlocking with a pressing operation of a key button, at least a portion of which is exposed to the outside of the electronic device. The connection substrate may be disposed to have a predetermined slope with respect to the main substrate.

The at least one substrate may be arranged to be within proximity of a battery.

The display module may include a foldable driver IC substrate for an LCD Driver IC (LDI) area, and may be mounted with an ear jack module at a position that does not overlap the driver IC substrate.

In a further example, an electronic device may include a display module with a curvature; a housing having a first surface adjacent to the display module, the first surface having a curvature corresponding to the curvature of the display module; at least one substrate disposed on a second surface of the housing, the second surface being opposite to the first surface; and a battery pack disposed alongside the at least one substrate, the at least one substrate and the battery pack being disposed to have a slope with respect to a horizontal plane.

FIG. 1 is a perspective view illustrating an example electronic device having a curved shape in accordance with aspects of the present disclosure.

Referring to FIG. 1, a display module 2 is installed at a front side of the electronic device 1, a speaker device 3 for receiving a counterpart's voice is installed over the display module 2, and a microphone device 6 for transmitting a user's voice to the counterpart is installed under the display module 2, thereby performing a basic communication function. In one example, an interface connector 7 for transmitting and receiving data to and from an external device in a wired manner or receiving external power for charging a battery pack is disposed at a side of the microphone device 6. It is understood that the electronic device is not limited to the above-described configuration. The microphone device 6 and the interface connector 7 may be disposed at various positions.

In one example, sensing electronic components for performing various functions of the electronic device 1 may be provided around the speaker device 3 of the electronic device 1. As for the components, a video call camera device 5 for video telephony (VT) with the counterpart may be mounted. In addition, a sensor device 4 may be mounted, which allows the electronic device 1 to operate adaptively according to a surrounding environment. The sensor device 4 may include an illumination sensor for detecting surrounding illumination and automatically adjusting brightness of a display according to the detected illumination, and/or a proximity sensor or infrared sensor for detecting proximity when being close to the user's head portion during call connection and deactivating the display module 2. In another example, at least one physical key button exposed through rear case frame 9 may be mounted on a side of the electronic device. In a further example, the key button may be used for a volume up/down button, a wake-up button, or a power on/off button. Although not illustrated, the electronic device may include various other mechanical structures mounted therein.

In one example, the display module 2 may have a curved shape with a predetermined curvature. In another example, the entire shape of the electronic device 1 may be curved according to the curved shape of the display module 2 such that the entire shape of the electronic device 1 has a curvature that is the same as or substantially similar to that of display module 2. In a further example, the display module 2 may be a touchscreen device having a region on which data input and output is performed. In this case, the display module 2 may be a touchscreen including both a liquid crystal display (LCD) module and a touch sensor panel. When the electronic device 1 includes a separate input object, such as a touch pen or a stylus pen for data input, the display module 2 may also include a sensor pad for detecting the object. The display module 2 may include a window for protecting the display module 2 which is mounted on the outer side of the electronic device 1.

In a further example, the curved display module 2 is used and the electronic components disposed under the display module 2 are disposed to have a slope with respect to a horizontal plane. As a result, this allows the electronic device to be slim even while being capable of performing various functions. Since the electronic device has the curved shape, grip feel may be improved. Therefore, the appearance of electronic device 1 may be more aesthetically pleasing than a conventional bar-type device; in turn, the appearance may make the device more competitive in the market and may make the device more desirable by users.

Figure 2:
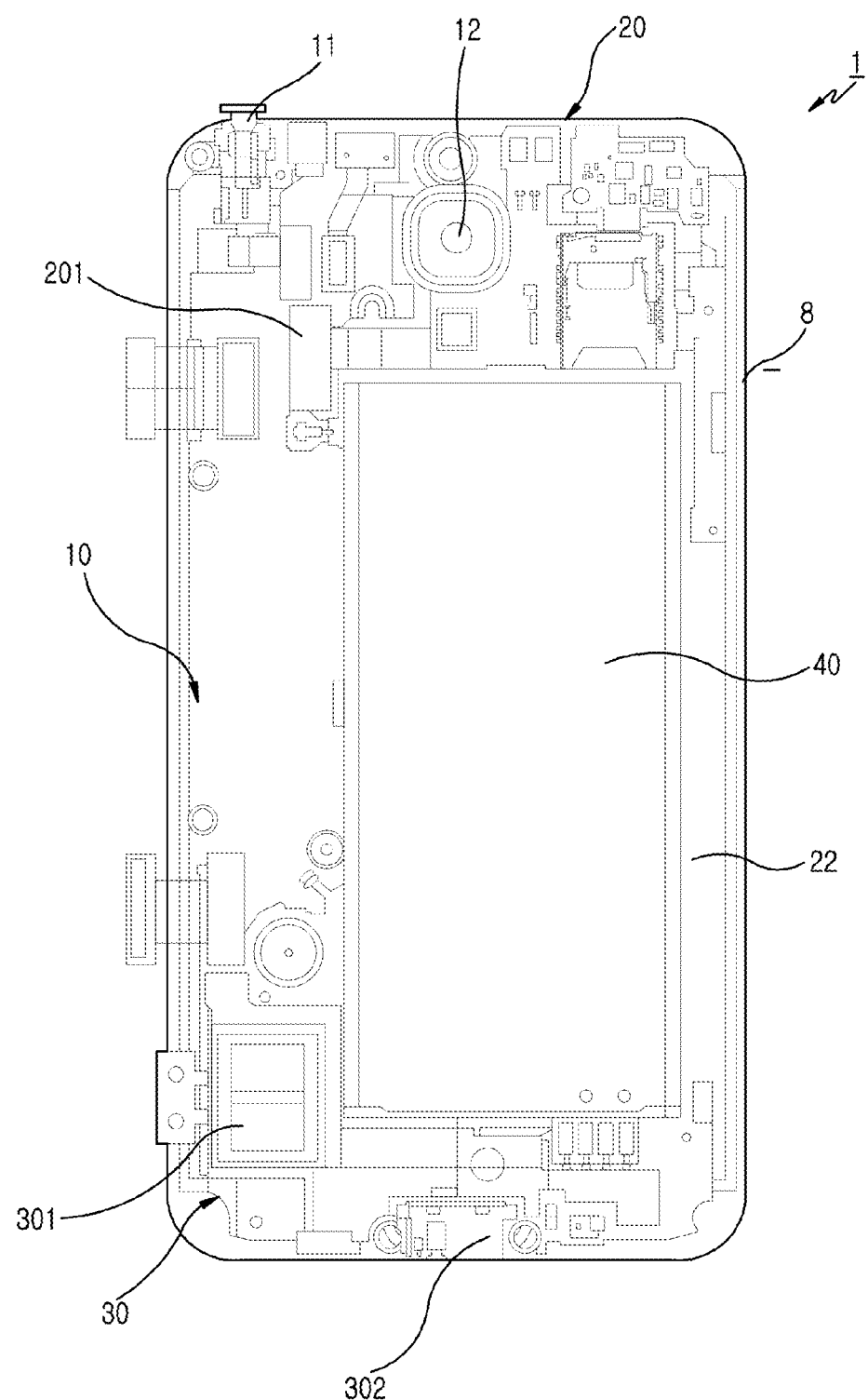
FIG. 2 is a configuration diagram illustrating an example structural arrangement of electronic components of an electronic device in accordance with aspects of the present disclosure.

FIG. 2 is a configuration diagram illustrating an example arrangement of electronic components inside the electronic device of the present disclosure.

Referring to FIG. 2, the electronic device 1 includes a curved display module 2 (see FIG. 1) mounted at the front side thereof and a housing 22 that supports the display module 2 mounted at the upper portion thereof. The electronic device may further include a front case frame 8 mounted to surround the rim of the housing 22 and to form the side appearance of the electronic device 1. In another example, a plurality of electronic components may be disposed in the upper portion of the housing 22. In yet a further example, the electronic components may include at least one substrate 10, 20 or 30 and a battery pack 40. In a further example, the electronic components may be at least one of an interface connector 302, a camera module 12, a microphone module (not illustrated), an ear jack module 11, an antenna module (not illustrated), a speaker module 301, a vibrator device (not illustrated), a shield can for shielding (not illustrated), a socket for accommodating a card-type external device (211 of FIG. 6), and various sensor modules (not illustrated).

In one example, the at least one substrate 10, 20 or 30 may be disposed to have a slope with respect to a horizontal plane because of the curved display module 2. Therefore, it may be difficult to use a substrate, having an area that is similar or equal to the entire area of the electronic device, as a single component. In another example, the at least one substrate 10, 20 or 30 may include a main substrate disposed in the longitudinal direction at a side of the electronic device and at least one sub-substrate 20 or 30 detachably and electrically connected to the main substrate 10. As illustrated in FIG. 2, the sub-substrate 20 or 30 may be electrically connected to the main substrate 10 through a predetermined connector 201. It is understood that the present disclosure is not limited to the above configuration such that more than two sub-substrates may be disposed in the electronic device. In one example, the at least one substrate 10, 20 or 30 may be disposed in accordance with at least one of a ⊏-shaped arrangement, an inverse-⊏-shaped arrangement, a T-shaped arrangement, and an I-shaped arrangement. In another example, the at least one substrate 10, 20, and 30 may be arranged within proximity of battery 40. However, it is understood that the present disclosure is not limited to these arrangements. The at least one substrate 10, 20 or 30 may be disposed in various shapes depending on a curvature radius of the display module 2.

In a further example, the camera module 12 and the ear jack module 11 may be disposed on the upper portion of the electronic device 1, and the connector 302 and the speaker module 301 may be disposed on the lower portion of the electronic device 1. In a further example, the electronic components may be disposed in such a way as to be disposed accordingly on the main substrate 10 or the at least one sub-substrate 20 or 30. In yet a further example, the electronic components may be electrically connected to the above-described substrates 10, 20 and 30 even though the electronic components are disposed accordingly inside the electronic device rather than on the main substrate 10 or the at least one sub-substrate 20 or 30.

In a further example, the battery pack 40 may be disposed so as not to be disposed on at least one substrate 10, 20 or 30. The battery pack 40 may be disposed so as to be next to at least one substrate 10, 20 or 30 without overlapping. The substrate 10, 20 or 30 and the battery pack 40 may be disposed at different slopes and in different inclined directions.

Figure 3:
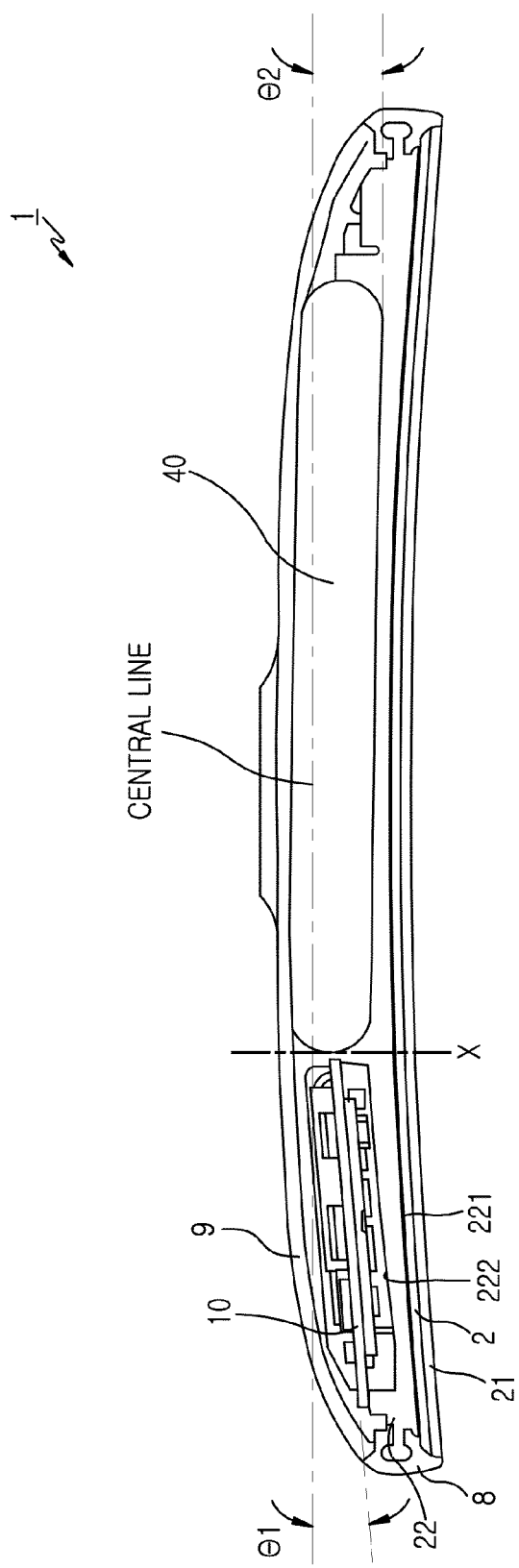
FIG. 3 is a cross-sectional view illustrating an example main portion of an electronic device in accordance with aspects of the present disclosure.

FIG. 3 is a cross-sectional view illustrating an example main portion of an electronic device in which a display module with curvature is disposed. Although an arrangement relationship between a battery pack and a main substrate is described, the technical characteristics described below may be also applied to an arrangement relationship between the battery pack and at the least one sub-substrate.

Referring to FIG. 3, the main substrate 10 and the battery pack 40 may be disposed to have a slope with respect to a horizontal plane. As illustrated in FIG. 3, the main substrate 10 may be disposed to have a predetermined angle θ1 with respect to a horizontal plane. The substrate may be disposed to have a slope of about 5 degree when the curvature radius of the display module 2 is 400 R (radius). In another example, the battery pack 40 may be disposed to have an angle of θ2. In a further example, the battery pack 40 may be disposed to have a slope of about 1 degree when the curvature radius of the display module 2 is 400 R. However, these numerical values are merely illustrative, and the arrangement may be made to have various efficient slopes depending on the shape and mounting space of the electronic device 1.

In a further example, the main substrate 10 and the battery pack 40 may be disposed to have a slope corresponding to a straight line passing a tangent of the display module 2 that corresponds to the central lines thereof. The main substrate 10 and the battery pack 40 may be disposed to have various effective angles depending on the shape and mounting space of the electronic device 1.

In one example, the housing 22 supporting the display module 2 may include a first surface 221 in a direction adjacent to the display module 2 and a second surface 222 which faces the first surface and in which a plurality of electronic components may be mounted. In another example, the first surface 21 may be formed to have a curvature identical to that of the display module 2. This causes the rear surface of the display module 2 to be very close to the first surface of the housing 22, thereby maximizing spatial availability and preventing damage from external impact.

The second surface 222 of the housing 22 may be formed to have a curvature substantially identical to the first surface. In a further example, the second surface of the housing 22 may be formed to be substantially flat. In yet a further example, there may be provided at least one mounting portion in which the main substrate 10 and the battery pack 40 are mounted. In another example, there may be provided at least one mounting portion in which the main substrate 10 and the battery pack 40 are mounted.

In another example, when the main substrate 10 and the battery pack 40 are disposed alongside each other, a border portion (X of FIG. 3) between the battery pack 40 and the main substrate 10 may be defined as starting point from which the battery pack 40 and the main substrate 10 start to incline. In a further example, the battery pack 40 and the main substrate 10 may be disposed to have different slopes than that of the border portion.

FIGS. 4A and 4B are cross-sectional views of an example electronic device illustrating an arrangement of a substrate. FIGS. 4A and 4B illustrate that spatial availability may be improved, when the substrate is disposed to have a slope, rather than disposing the substrate parallel to the plane.

When the overall length of the main substrate 10 is d2 as illustrated in FIG. 4B, a portion is cased to be Therefore, the main substrate 10 may be disposed to have a slope as illustrated in FIG. 4B. When the overall length d4 of the battery pack 40 is 19.7 mm, and the battery pack 40 is disposed to have a slope with respect to a plane, spatial availability of 3.5 mm may be further obtained in a same mounting condition, thereby improving a space by 21%. Therefore, larger electronic components may be mounted under the same mounting condition.

FIGS. 5A and 5B are example cross-sectional views of an example electronic device illustrating an arrangement of a substrate. FIGS. 5A and 5B illustrates that spatial availability may be improved when a battery pack is disposed to have a slope rather than being disposed parallel to a plane.

When the overall length of the battery pack 40 is d4 as illustrated in FIG. 5A, a portion corresponding to a length of d3 may be wasted space. Therefore, the main substrate 10 may be disposed to have a slope as illustrated in FIG. 5B, thereby allowing the battery pack 40 to have the overall length of d4. In one example, when the overall length d4 of the battery pack 40 is 45 mm and the battery pack 40 is disposed to have a slope with respect to a plane, spatial availability of 5.2 mm may be further obtained in a same mounting condition, thereby improving a space by 13%. Therefore, a battery pack having a larger capability may be used under the same spacing or casing conditions.

Figure 6:
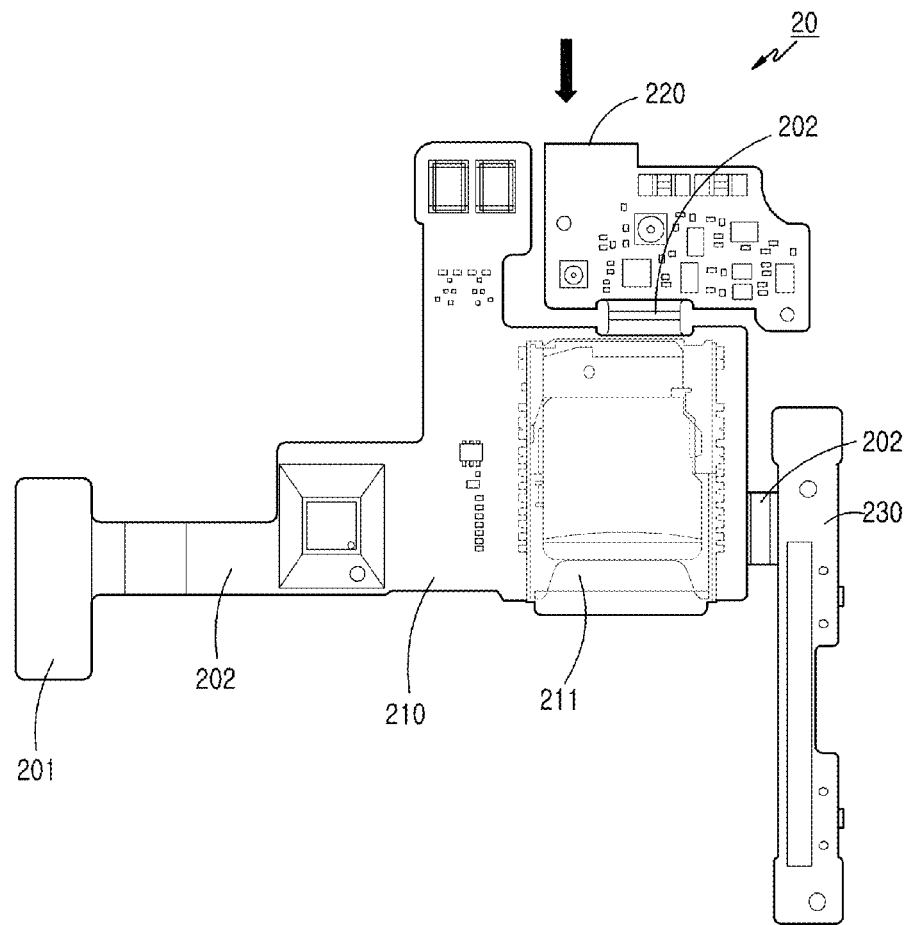
FIG. 6 is a configuration diagram of an example sub-substrate in accordance with aspects of the present disclosure.

FIG. 6 is an example configuration diagram of an example sub-substrate. A second sub-substrate may have a technical configuration identical or similar to that of the substrate shown in FIG. 6.

Referring to FIG. 6, the sub-substrate 20 may include a first connection substrate 210 which is electrically connected to the main substrate 10, and a second connection substrate 220 and a third connection substrate 230 which is electrically connected to the first connection substrate 210 at different positions. The first, second, and third connection substrates 210, 220 and 230 may be formed of rigid material and be connected to one another through an electrical connection portion 202 which may be flexible. Therefore, the respective connection substrates 210, 220 and 230 may be configured to be movable to one another. This may be advantageous when the substrates 210, 220 and 230 are in an electronic device with a curved display module 2. The respective connection substrates 210, 220 and 230 may be disposed to have different slopes. A flexible printed circuit (FPC) may be used as the flexible electric connection portion 202.

In one example, the connector 201 for electrically connecting to the main substrate 10 is electrically and movably connected to the first connection substrate 210 by a flexible printed circuit depending on a distance from the main substrate 10. Various electronic components may be mounted in each of the connection substrates 210, 220 and 230. A socket 211 for selectively connecting a card-type external device may be mounted in the first connection substrate 210. The antenna module (see FIG. 7) may be mounted in the second connection substrate 220. A key button device (see FIG. 8) may be mounted in the third connection substrate.

In a further example, the respective connection substrates 210, 220 and 230 may be connected to one another and, at the same time, may be disposed to have different slopes, thereby enabling effective mounting of the above-described electronic components.

Figure 7:
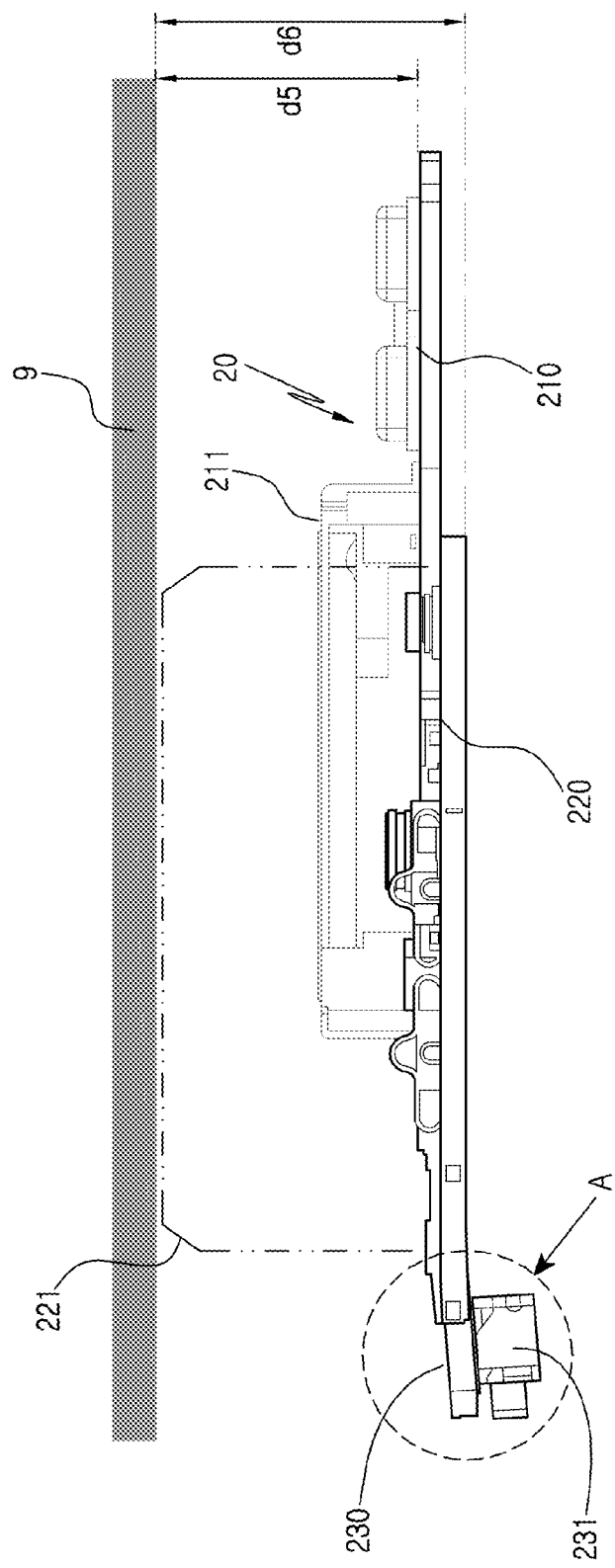
FIG. 7 is a diagram illustrating a configuration in which an antenna module is disposed in a sub-substrate in accordance with aspects of the present disclosure.

FIG. 7 is a diagram illustrating an example configuration in which an antenna module is disposed in a sub-substrate. Referring to FIG. 7, the antenna module 221 may be mounted on the second connection substrate 220 of the second sub-substrate 20. The radiation efficiency of an antenna radiator of the antenna module 221 may be proportional to its distance from the substrate. Therefore, the radiation efficiency increases as the antenna module 221 is farther from the substrate.

In a further example, the second connection substrate 220 may have a height d5 that is substantially identical to that of the first connection substrate 210, as illustrated in FIG. 7. In this instance, the second connection substrate 220 may be distanced further from rear case frame 9, by a distance of d6, which is further than the distance between the first connection substrate 210 and rear case frame 9. Therefore, the antenna module 221 mounted on the second connection substrate 220 may be further distanced from the substrate by a length of d6−d5. A separate antenna carrier may be mounted to provide a distance between the second connection substrate 220 and the antenna radiator. The antenna carrier may be mounted at a height that increases by the length of d6−d5, thereby improving radiation efficiency.

Figure 8:
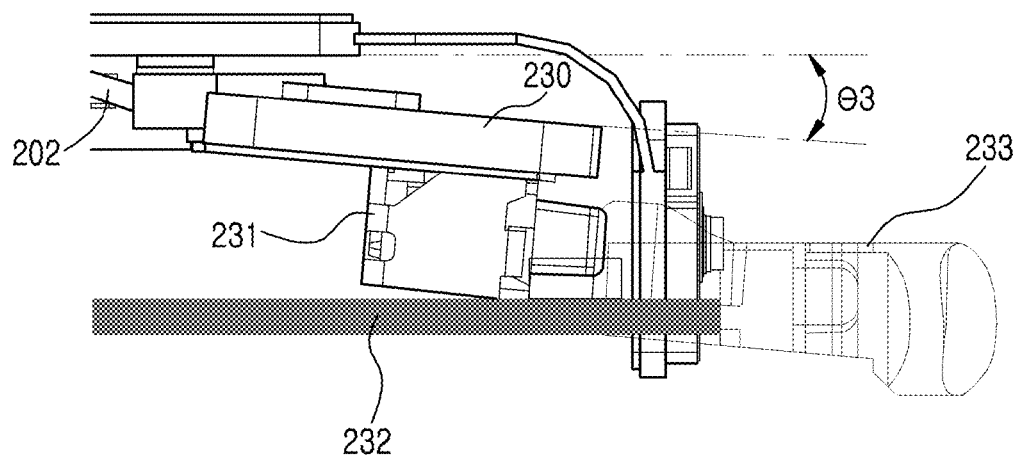
FIG. 8 is a diagram of an example structure of a tack switch for key button manipulation in accordance with aspects of the present disclosure.

FIG. 8 is a diagram of an example structure in which a tack switch for key button manipulation is disposed in a sub-substrate. FIG. 8 is an enlarged example configuration diagram of a portion A of FIG. 7.

Referring to FIG. 8, the third connection substrate 230 may be disposed to have a slope at an angle of θ3 with respect to a plane by the flexible printed circuit. This configuration may have a z-axis mounting height that is less than that of an existing key button device employing a metal dome. The decreased z-axis mounting height of this configuration may be accomplished by using a flexible printed circuit board (FPCB) and may prevent generation of a hole through additional coring of the support bracket 232. The above configuration may be beneficial upon an immersion test for the electronic device. In a further example, a tact switch 231 may be used as a switching device. Tact switch 231 may be mounted in the third connection substrate 230 and may operate in interlocking with the pressing operation of a key button 233. Key button 233 may be mounted such that at least a portion of the key button 233 is exposed to the outside of the electronic device 1.

Figures 9A, 9B:
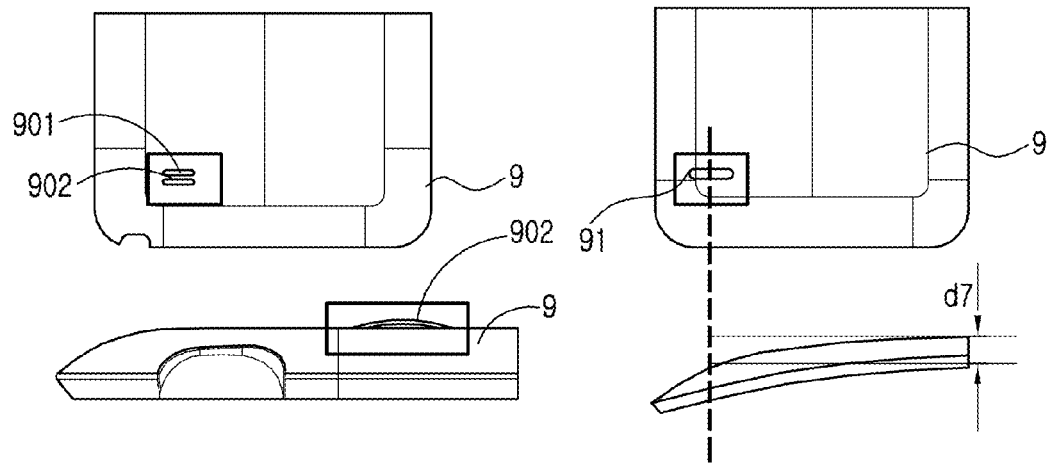
FIG. 9A and FIG. 9B are diagrams illustrating an example structure of a speaker sound emission hole in accordance with aspects of the present disclosure.

FIGS. 9A and 9B are diagrams illustrating an example structure in which a speaker sound emission hole is disposed in a case frame. FIG. 9A is a diagram illustrating an example electronic device having a flat rear case frame and FIG. 9B is a diagram illustrating an example electronic device having a rear case frame with a curvature.

Referring to FIG. 9A, a speaker sound emission hole 901 for emitting speaker sound generated by a speaker module may be formed in the rear case frame 9 of the electronic device 1. When the electronic device 1 is placed on a floor, the surface of the rear case frame 9 formed to be flat is closely in contact with the floor to close the speaker sound emission hole 901, thereby preventing speaker sound from being emitted smoothly. Therefore, it may be necessary to form a support that projects upward around the speaker sound emission hole 901, which may not be aesthetically pleasing.

Referring to the example of FIG. 9B, the rear case frame 9 of the electronic device 1 is formed in a curved shape, the left and right sides of which are upwardly curved. In this instance, the speaker sound emission hole 91 may be formed on a curved portion. Therefore, even when the electronic device 1 is placed on the floor, the speaker sound emission hole 91 is not in close contact with the floor due to the shape of the curved rear case frame 9. In turn, speaker sound may be emitted toward the outside even without a separate support projection. The electronic device 1 includes no separate support projection, making the appearance of the electronic device 1 more aesthetically pleasing.

Figure 10:
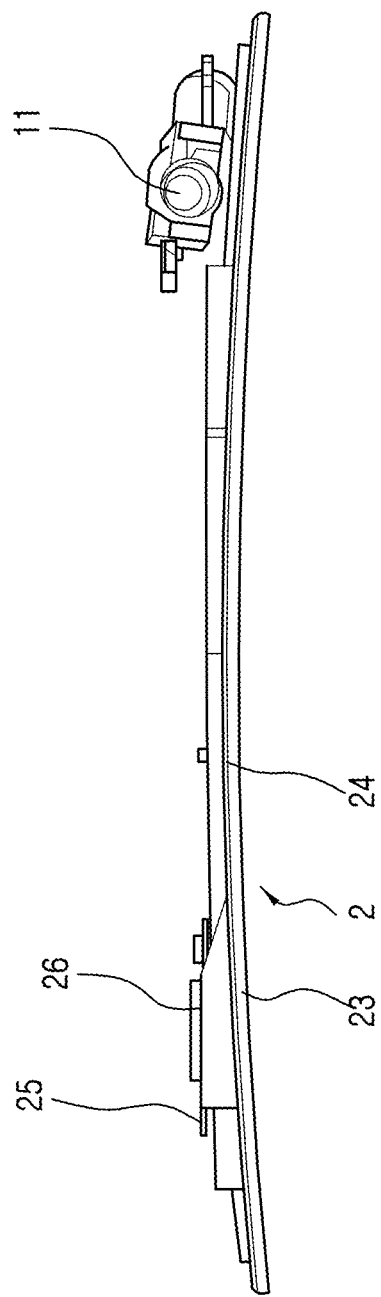
FIG. 10 is a diagram illustrating an example arrangement relationship between a display module and an ear jack module in accordance with aspects of the present disclosure.

FIG. 10 is a diagram illustrating an example arrangement relationship between a display module and an ear jack module. Referring to FIG. 10, the display module 2 may be a touchscreen device. In a further example, the display module 2 may be formed in such a way that a LCD module 23 and a touch sensor pad 24 are mounted in a layered structure, and may include a foldable driver IC substrate 25 for an LCD Driver IC (LDI) area. In a further example, the driver IC substrate 25 may be mounted in a state of being folded to the rear surface of the display by the flexible printed circuit (FPC) 26. In the electronic device 1, the ear jack module 11 may be mounted in the same plane as the driver IC substrate 25. When the ear jack module 11 is disposed at a position that does not overlap the driver IC substrate 25, interference between the ear jack module 11 and the driver IC substrate 25 may occur or the volume of the electronic device 1 may increase.

In one example, the ear jack module 11 may be disposed at a position that does not overlap the driver IC substrate 25 of the display module. The driver IC substrate 25 and the ear jack module 11 may be disposed opposite to each other as illustrated in FIG. 10. However, it is understood that the example of FIG. 10 is not limited to the above-described configuration, and that the ear jack module 11 may be disposed at various positions that do not overlap driver IC substrate 25 of the display module.

Figure 11A:
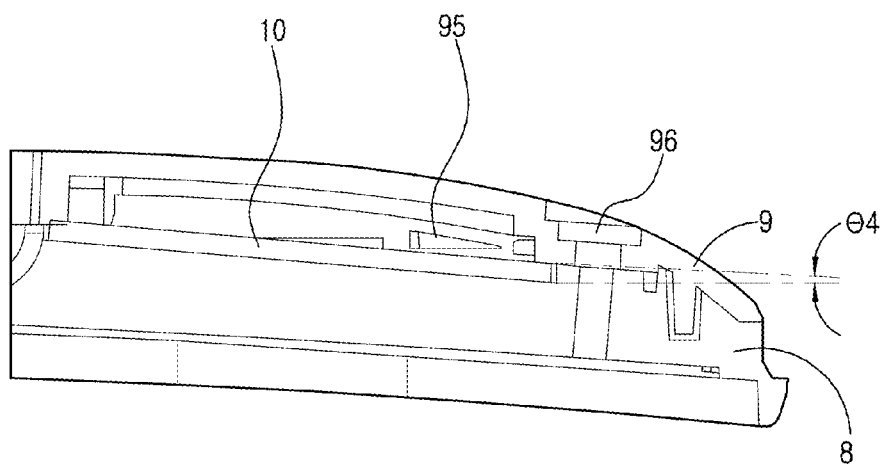
FIG. 11A and FIG. 11B are diagrams illustrating an example structural arrangement of a bushing and a sleeve in accordance with aspects of the present disclosure.
Figure 11B:
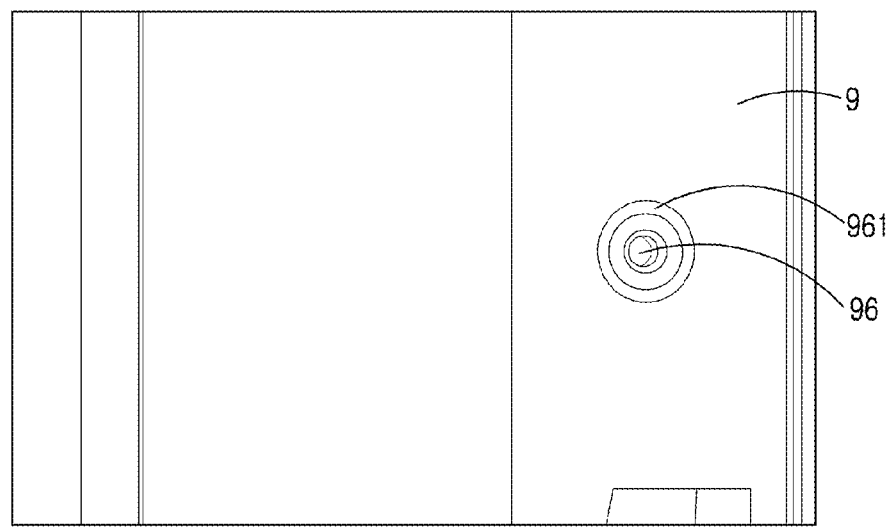

FIGS. 11A and 11B are diagrams illustrating example structural arrangements of a bushing for supporting a substrate. FIGS. 11A and 11B also illustrate a sleeve for screw engagement.

Referring to FIGS. 11A and 11B, at least one boss 95 for supporting the main substrate 10 may be formed in the rear case frame 9. In a further example, the at least one boss 95 may be formed to protrude at predetermined intervals along portions of the rear case corresponding to edges of the main substrate 10, thereby preventing the main substrate 10 from moving in x- and y-directions. In a further example, a mounting portion for the boss 95 may be formed to have a slope at an angle of θ4 with respect to a plane. In yet another example, the angle of θ4 may be 1 or more degrees.

In another example, a screw engagement hole 96 may be formed in a side of the boss 95. In FIG. 11B, a sleeve 961 for mounting of a circular jig for screw engagement which has a predetermined width may be formed inside the screw engagement hole 96 in a circumference direction.

In a further example, the mounting portion for the boss 95 for supporting the substrate 10 is formed to have a slope in the curved electronic device 1, thereby enlarging the area of the sleeve 961 for mounting of the jig for screw engagement even without movement of the boss into the inside of the electronic device, and allowing for efficient and precise screw engagement.

Advantageously, the curved electronic device disclosed herein allow electronic components to be efficiently mounted, thereby contributing to a slim profile of the electronic device and making the appearance of the electronic device more aesthetically pleasing. In addition, excellent portability and grip feel may be provided.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

What is claimed is:

1. An electronic device comprising:
a curved display module including a concave surface forming an exterior of the electronic device, and a convex interior surface forming a portion of an interior of the electronic device;
a housing having a first surface adjacent to the display module, the first surface having a curvature corresponding to a curvature of the display module; and
a battery pack disposed adjacent to a terminal edge of at least one electronic component without overlapping the at least one electronic component in a second surface of the housing, the second surface being opposite to the first surface and having the curvature, and the battery pack disposed within the electronic device as to form an angle with a horizontal plane tangent to a center of the curved display module,
wherein the at least one electronic component comprises at least three connection substrates flexibly coupled by flexible connector portions, including a first connection substrate disposed adjoining a top terminal edge of the battery pack, a second connection substrate disposed at a top terminal edge of the first connection substrate such that the first connection substrate is disposed between the second connection substrate and the battery pack, and a third connection substrate disposed along a side terminal edge of the first connection substrate and extending along a side terminal edge of the battery pack, and
wherein an opening is provided along the curvature of the second surface such that the opening is unobstructed by a flat surface when the electronic device is set, via the second surface, on the flat surface.

2. The electronic device of claim 1, wherein the angle formed with the horizontal plane is greater than zero degrees and less than ninety degrees, and
wherein the first connection substrate includes a card socket disposed thereon, the second connection substrate includes an antenna module such that the first connection substrate is disposed between the antenna and the battery pack, and the third connection substrate includes a pressable key.

3. The electronic device of claim 2, wherein the second surface of the housing is formed to have a slope substantially identical to a slope with which the at least one electronic component is disposed or is formed to be substantially flat to support the at least one electronic component, and
wherein the at least one electronic component is disposed within the electronic device to form a second angle with the horizontal plane, the second angle greater than zero degrees and less than ninety degrees, and different from the angle of the battery pack.

4. The electronic device of claim 3, wherein the second surface of the housing includes at least one mounting portion for mounting the at least one electronic component, which is formed thereon along the slope with which the at least one electronic component is disposed.

5. The electronic device of claim 1, wherein a speaker module is disposed within the housing aligned to the opening of the housing; and
wherein the at least one electronic component is at least one of at least one substrate, an interface connector, a camera module, a microphone module, an ear jack module, an antenna module, a vibrator device, a shield can for shielding, a socket for accommodating a card-type external device, and various sensor modules.

6. The electronic device of claim 5, wherein the at least one electronic component comprises a main substrate, such that a border portion between the battery pack and the substrate is a starting point from which the battery pack and a main substrate start to incline, when the main substrate and the battery pack of the at least one electronic components are disposed alongside each other.

7. The electronic device of claim 5, wherein the flexible connector portions comprise a flexible printed circuit (FPC) disposed between each substrate.

8. The electronic device of claim 7, wherein the at least three connection substrates includes:
a main substrate; and
at least one sub-substrate electrically connected to the main substrate, the sub-substrate comprising at least one connection substrate electrically connected thereto by the FPC.

9. The electronic device of claim 8, wherein at least one of the sub-substrate and the connection substrate is disposed at a height different than that of the main substrate.

10. The electronic device of claim 9, wherein an antenna radiator having a predetermined height is mounted in the substrate at a height different than that of the main substrate.

11. The electronic device of claim 10, wherein the antenna radiator having the predetermined height is disposed in an antenna carrier mounted in at least one of the sub-substrate and the connection substrate.

12. The electronic device of claim 10, wherein the antenna radiator is mounted in a substrate which is further spaced apart from a case frame of the electronic device.

13. The electronic device of claim 8, wherein the connection substrate is disposed at a height different than that of the sub-substrate, the connection substrate being mounted with a tact switch that operates in interlocking with a pressing operation of a key button, at least a portion of which is exposed to the outside of the electronic device.

14. The electronic device of claim 13, wherein the connection substrate is disposed to have a predetermined slope with respect to the main substrate.

15. The electronic device of claim 8, wherein the at least one substrate is arranged to be in proximity of a battery.

16. The electronic device of claim 1, wherein the display module includes a foldable driver IC substrate for an LCD Driver IC (LDI) area mounted with an ear jack module at a position that does not overlap the driver IC substrate.

17. An electronic device comprising:
a curved display module including a concave surface forming an exterior of the electronic device, and a convex interior surface forming a portion of an interior of the electronic device;
a housing having a first surface adjacent to the display module, the first surface having a curvature corresponding to a curvature of the display module;
at least one substrate disposed on a second surface of the housing, the second surface being opposite to the first surface and having the curvature; and
a battery pack disposed adjacent to a terminal edge of the at least one substrate without overlapping the at least one substrate, the at least one substrate and the battery pack forming respective angles with a horizontal plane tangent to a center of the curved display module,
wherein the at least one substrate comprises at least three connection substrates flexibly coupled by flexible connector portions, including a first connection substrate disposed to adjoin a top terminal edge of the battery pack, a second connection substrate disposed at a top terminal edge of the first connection substrate such that the first connection substrate is disposed between the second connection substrate and the battery pack, and a third connection substrate disposed along a side terminal edge of the first connection substrate and extending along a side terminal edge of the battery pack, and wherein an opening is provided along the curvature of the second surface such that the opening is unobstructed by a flat surface when the electronic device is set, via the second surface, on the flat surface.

18. The electronic device of claim 17, wherein a speaker module is disposed within the housing aligned to the opening of the housing; and the second surface of the housing is formed to have a slope substantially identical to a slope in which the at least one substrate is disposed or is formed to be substantially flat to support the at least one substrate, wherein the respective angles formed with the horizontal plane are greater than zero degrees and less than ninety degrees, and wherein the first connection substrate includes a card socket disposed thereon, the second connection substrate includes an antenna module such that the first connection substrate is disposed between the antenna and the battery pack, and the third connection substrate includes a pressable key.

19. The electronic device of claim 18, wherein a border region between the battery pack and the substrate is a starting point from which the battery pack and the substrate begin to incline, and wherein the at least one substrate is disposed within the electronic device to form a second angle with the horizontal plane, the second angle greater than zero degrees and less than ninety degrees, and different from the angle of the battery pack.

20. The electronic device of claim 17, wherein the at least one substrate is electrically connected such that at least two substrates are mutually movable by a flexible printed circuit (FPC), the at least two substrates being disposed at different heights.

21. The electronic device of claim 1, wherein the first connection substrate includes a card socket disposed thereon, the second connection substrate includes an antenna module such that the first connection substrate is disposed between the antenna and the battery pack, and the third connection substrate includes a pressable key.

* * * * *